June 16, 1931.  P. THOMAS  1,810,063
CONDENSER BUSHING VOLTAGE CONTROL
Filed June 13, 1929
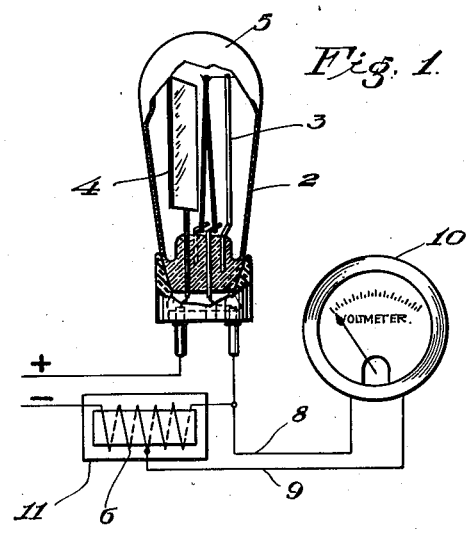
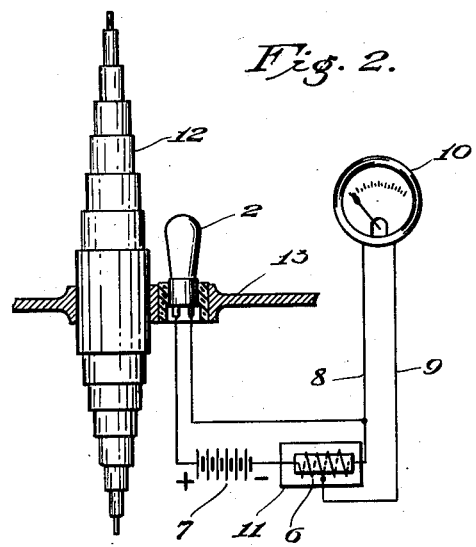
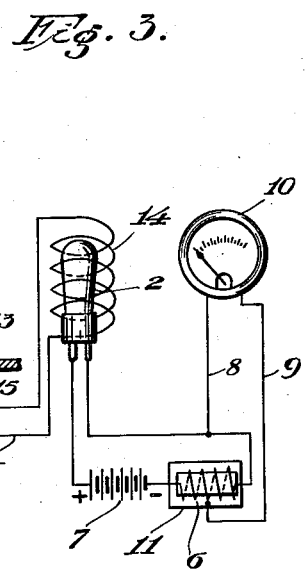
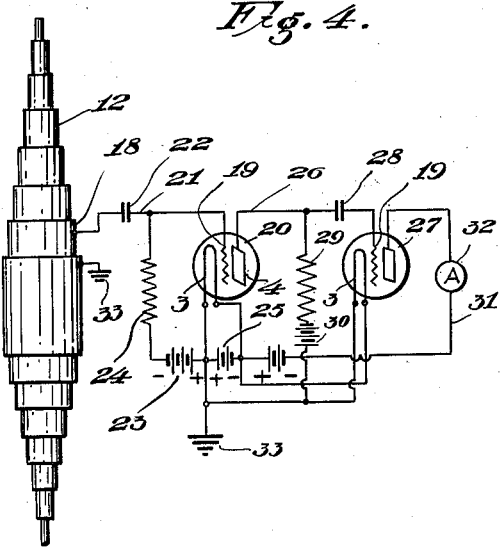
INVENTOR
Phillips Thomas.
BY
ATTORNEY Patented June 16, 1931

1,810,063

UNITED STATES PATENT OFFICE

PHILLIPS THOMAS, OF EDGEWOOD, PENNSYLVANIA, ASSIGNOR TO WESTINGHOUSE ELECTRIC & MANUFACTURING COMPANY, A CORPORATION OF PENNSYLVANIA

CONDENSER-BUSHING VOLTAGE CONTROL

Application filed June 13, 1929. Serial No. 370,689.

My invention relates to a method of, and means for, effecting a control from an electrostatic field.

In the measurement of quantities and characteristics, and in the control of high-voltage electrical apparatus, a convenient method has been used for obtaining a low voltage proportional to the high voltage which comprises tapping off different layers of a condenser-type bushing and utilizing the current derived from the difference in potential between the tapped layers to energize a control device, such as a synchroscope, a voltmeter or a relay.

The devices heretofore utilized for this purpose are either only successful on extremely high voltages, such as voltages above 110 kilovolts, or with control apparatus requiring only a small energizing current.

My invention has for an object to provide a method of, and means for, energizing a control device by the voltage of a condenser bushing, regardless of the magnitude of the voltage of the condenser bushing.

Another object of my invention is to provide a method of, and means for, effectively energizing a control device by the voltage of a condenser bushing even though the resulting current is very small.

A further object of my invention is to provide external power-supply means for amplifying the current derived from the field of a condenser bushing.

These and other desirable objects are set forth in the following explanation of my invention, modifications of which are illustrated in the accompanying drawings, in which Figure 1 is an elevational view of a two-element vacuum tube, partially broken away, and in section, together with associated circuits, constructed in accordance with my invention.

Fig. 2 is a diagrammatic view of a modification of my invention which utilizes a two-element tube, as illustrated in Fig. 1, in the electrostatic field of a condenser bushing.

Fig. 3 is a view, similar to Fig. 2, of another modification which utilizes a two-element tube together with an external grid, and Fig. 4 is a diagrammatic view of a modification of a prior art device which utilizes a three-element vacuum tube and an amplifying tube.

Figure 1 of the drawings shows a two-element vacuum tube 2 having a filament or cathode 3 and a plate or anode 4 mounted in an evacuated container 5 of the usual construction. The vacuum tube 2 is similar to the usual three-element thermionic tube except that the grid has been removed for purposes that will be explained hereinafter.

One of the terminals of the filament 3 is connected, through a winding 6, to the negative terminal of a battery 7 (Fig. 2), and the terminal of the plate 4 is connected to the positive terminal of the battery 7. The winding 6 functions as the primary winding of a transformer, the secondary of which, comprising one-half of the winding 6, is connected, by conductors 8 and 9, to a control device 10 which may be an indicating meter, a relay or a synchroscope, but which is, in the present case, by way of example, a voltmeter.

The application of an electrostatic field to the electron stream from the filament 3 to the plate 4 causes an alternating-current component in the plate circuit, including the winding 6, which causes the voltmeter 10 to indicate. The transformer 11 prevents the direct current of the plate circuit from affecting the voltmeter 10.

The two-element vacuum tube 2 may be placed directly in a static field produced by the voltage between a condenser bushing 12 and a container 13 in which the condenser bushing is mounted, either by placing the tube 2 in the static field itself, as shown in Fig. 2, or by utilizing an external grid 14 that is energized, in accordance with the static field produced by the voltage of the condenser bushing 12, by means of conductors 15 and 16 tapped to different layers 17 and 18 of the condenser bushing. The conductor 15 may be connected to the metal tank container 13, since the outer layer 17 of the condenser bushing is grounded through the conducting tank 13.

In the prior art, as indicated in Fig. 4, the voltage drop across the first section of the condenser bushing 12 energizes the grid 19 of a standard vacuum tube 20 by means of a conductor 21 connecting the second layer 18, through a condenser 22, to the grid 19. A C-battery 23 is provided in circuit with a grid leak 24 to produce a negative bias on the grid 19. The filament 3 of the tube 20 is heated by an A-battery 25 of the usual type, and the plate 4 is connected, by a conductor 26, in the usual manner, to the grid 19 of an amplifying vacuum tube 27 through a condenser 28.

A grid leak 29 is connected, through a negative biasing C-battery 30, to the grid 19 and the filament 3 of the amplifying tube 27. The plate circuit 31 of the amplifying tube 27 is provided with a device, such as an ammeter 32, for indicating a characteristic of the voltage between the condenser bushing 12 and the ground 33.

By using an open-plate design, as shown in Fig. 1, and an external grid structure 14, as shown in Fig. 3, the large negative-biasing voltages of the C-battery, shown in Fig. 4, are no longer needed. The use of the external grid structure 14 greatly simplifies the means for measuring the high voltage across the circuit-breaker insulating bushing 12.

The instrument 10 is preferably employed to read only the alternating current component of the plate current, and the instrument 10, as mentioned above, may be a volt meter or one phase of a synchroscope. It has been found that the assembly illustrated in Fig. 3 produces enough energy to operate the movement of a voltmeter or synchroscope of a standard design.

In addition, the use of an external grid structure 14, as shown in Fig. 3, may be avoided by simply placing the vacuum tube 2 so that the electrostatic field of the bushing acts directly upon the electron stream, as shown in Fig. 2.

My invention is particularly applicable to voltages in the vicinity of, and below, 110 kilo-volts where it is impossible to derive any but a very small quantity of current from the electrostatic field, the characteristic of which is being measured. The vacuum tube 2 of my invention supplies sufficient current of itself to operate the necessary devices 10 accurately and strictly in accordance with the characteristic of the electrostatic field to be determined.

While I have shown and described my invention in connection with a condenser bushing, it will be apparent to those skilled in the art that it is equally applicable to all electrical apparatus wherein an electrostatic field is produced and that various other modifications may be made in my invention, all of which I intend shall be included within the scope of the appended claims.

I claim as my invention:

1. The combination with a condenser bushing, a conducting tank supporting said bushing, and a controlled device, of means for affecting said controlled device in accordance with the potential impressed on said bushing, including a two-element electronic device disposed in the electrostatic field between said condenser bushing and said tank and in circuit relation with said controlled device.

2. The combination with a condenser bushing, a conducting tank supporting said bushing, and a controlled device, of means for affecting said controlled device in accordance with the potential impressed on said bushing, including a two-element electronic device disposed in the electrostatic field which is proportional to the difference of potential between said condenser bushing and said tank.

3. In combination with a high-tension bushing, a conducting tank supporting said bushing, an electro-responsive device, means for controlling said device in accordance with the potential impressed on said bushing including a two-element electronic device disposed in the electrostatic field between said bushing and tank and in circuit relation with said electro-responsive device.

In testimony whereof, I have hereunto subscribed my name this first day of June, 1929.

PHILLIPS THOMAS.